US010651726B1

(12) United States Patent
Chen et al.

(10) Patent No.: US 10,651,726 B1
(45) Date of Patent: May 12, 2020

(54) SOFT TRANSITION TECHNIQUES FOR H-BRIDGE CONVERTER

(71) Applicant: Analog Devices International Unlimited Company, Limerick (IE)

(72) Inventors: Hai Chen, Gilbert, AZ (US); Gregory J. Hughes, Paradise Valley, AZ (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/401,633

(22) Filed: May 2, 2019

(51) Int. Cl.
*H02M 1/36* (2007.01)
*H02M 7/5387* (2007.01)
*H02M 3/335* (2006.01)

(52) U.S. Cl.
CPC ........... *H02M 1/36* (2013.01); *H02M 7/5387* (2013.01); *H02M 3/33569* (2013.01)

(58) Field of Classification Search
CPC .. H02M 1/36; H02M 3/33569; H02M 7/5387; H02M 7/5388
See application file for complete search history.

(56) References Cited

U.S. PATENT DOCUMENTS

| 6,380,694 | B1* | 4/2002 | Uchihashi | H05B 41/2883 315/224 |
|---|---|---|---|---|
| 10,181,804 | B1* | 1/2019 | Li | H02M 1/36 |
| 2007/0120543 | A1* | 5/2007 | Caldwell | H02M 1/10 323/272 |
| 2014/0313790 | A1* | 10/2014 | Feng | H02M 1/36 363/21.02 |
| 2015/0180345 | A1* | 6/2015 | Frost | H02M 3/3376 363/17 |
| 2016/0072301 | A1* | 3/2016 | Maniktala | H04B 5/0037 307/104 |
| 2017/0018970 | A1* | 1/2017 | Zhang | H02J 50/12 |
| 2018/0301934 | A1* | 10/2018 | Prabhala | H02J 50/12 |
| 2019/0207534 | A1* | 7/2019 | Mueller | H02J 3/383 |
| 2019/0296590 | A1* | 9/2019 | Chae | H02J 50/12 |
| 2019/0386572 | A1* | 12/2019 | Itoh | H02M 1/088 |

* cited by examiner

*Primary Examiner* — Fred E Finch, III
(74) *Attorney, Agent, or Firm* — Schwegman Lundberg & Woessner, P.A.

(57) ABSTRACT

Techniques for starting up and shutting down a H-bridge are provided. In an example, a method can include ramping an internal reference voltage of the H-bridge between a first level and a second level during a first interval, controlling an output voltage of each of a first half-bridge of the H-bridge and a second half-bridge of the H-bridge independently during the first interval based on the reference voltage, and controlling the first half-bridge and second half-bridge as a full H-bridge during a second timed interval.

21 Claims, 6 Drawing Sheets

SOFT TRANSITION TECHNIQUES FOR H-BRIDGE CONVERTER

TECHNICAL FIELD OF THE DISCLOSURE

The present disclosure is related to switching circuits and more particularly to starting up and shutting down H-bridge switching circuits.

BACKGROUND

H-bridge converters can be used for a wide range of applications such as, but not limited to, a driver circuit for a low dropout switching power supply, a driver for a load such as a motor load, other inductive loads, a resistive load, a capacitive load or combination thereof. During start-up and shutdown of the H-bridge, a system can experience voltage or current spikes. During shutdown, residual energy of the system can dissipate without control.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized improved techniques for operating a H-bridge converter. In certain examples, the techniques can reduce or eliminate chaotic voltage and current transients associated with conventional methods of starting up and shutting down an H-bridge converter. In certain examples, control of the bridge of the H-bridge converter can transition between dual half-bridge control and full bridge control during start-up, during shutdown, or during both start-up and shutdown. In certain examples, during start-up and shutdown, the H-bridge can apply and maintain a predetermined differential voltage and current to a load while ramping each supply rail of the load to a predetermined voltage. In certain examples, the predetermined voltage at the end of start-up can be half of the supply voltage of the H-bridge converter. In certain examples, the predetermined voltage at the end of the shutdown can be zero volts or ground of the system.

Figure 1:
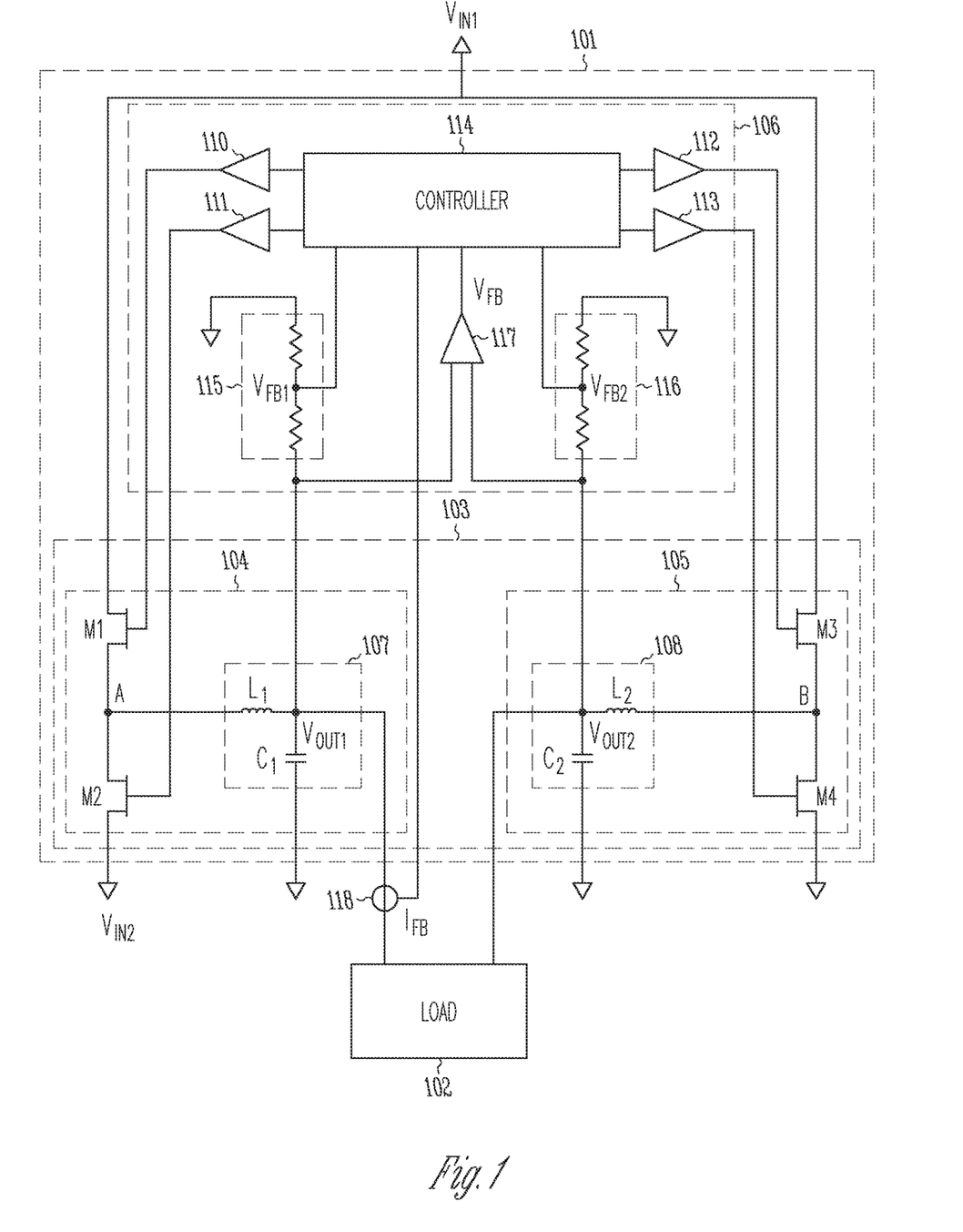
FIG. 1 illustrates generally a system including example control circuitry according to the present subject matter.

FIG. 1 illustrates generally a system 100 including example control circuitry according to the present subject matter. The system can include an H-bridge converter 101 and a load 102 coupled to load supply rails, or output voltage nodes ($V_{OUT1}$, $V_{OUT2}$), of the H-bridge converter 101. The H-bridge converter 101 can include an H-bridge 103 including a first half-bridge 104 and a second half-bridge 105 and control circuitry 106. Each half-bridge 104, 105 can include a first, or top, power transistor (M1, M3), a second, or bottom, power transistor (M2, M4), and, optionally, an inductor-capacitor (LC) filter 107, 108. Each top power transistor (M1, M3) can be coupled in series with a corresponding bottom power transistor (M2, M4) between the supply rails ($V_{IN1}$, $V_{IN2}$) of the H-bridge converter 101. A node (A, B) common to each coupled pair of top and bottom transistors (M1 and M2, M3 and M4) can be coupled to the load 102. In certain examples, the common node (A, B) can be couple to the load via the inductor (L1, L2) of the respective LC filter 107, 108.

The control circuitry 106 can include drivers 110, 111, 112, 113 for the power transistors, a controller 114, and sense circuitry for providing feedback information to the controller 114. In certain examples, the sense circuitry can include, for example, voltage dividers 115, 116 to provide a representation ($V_{FB1}$, $V_{FB2}$) of the output voltage ($V_{OUT1}$, $V_{OUT2}$) at each output voltage node of the H-bridge 103. In some examples, the sense circuitry can include an amplifier 117 to provide a representation ($V_{FB}$) of the differential voltage between the output voltage nodes of the H-bridge 103. In certain examples, the inputs of the amplifier 117 can be coupled to the voltage dividers 115, 116. In certain examples, the sense circuitry can include a current sensor 118 for providing a representation ($I_{FB}$) of the current level at the load 102, a direction of the current at the load 102, or level of the current at the load 102 and a direction of the current at the load 102.

The controller 114 can receive information from the sensing circuitry and can provide control signals to the power switches (M1, M2, M3, M4) via drivers 110, 111, 112, 113. In certain examples, the controller 114 can receive command information from a host (not shown) to apply to the load 102. In certain examples, the commend information can take the form of a desired voltage to apply to the load 102 or a desired current to apply to the load 102. The controller 114 can control the drivers 110, 111, 112, 113 in response to the command information, in response to feedback error derived from the command information, or a combination thereof. In certain examples, such as at start-up or shutdown of the H-bridge 103, the controller 114 can isolate control from the host to provide an ordered start-up or shutdown sequence and avoid or reduce slamming the load 102 with energy and dealing with the resultant voltage spikes, current spikes, and ringing that can be common.

In certain examples, an example controller 114 can start the H-bridge by ramping the voltage ($V_{OUT1}$, $V_{OUT2}$) at the output nodes together to a predetermined voltage level between the voltage level of the first supply rail ($V_{IN1}$) and the voltage level of the second supply rail ($V_{IN2}$). The ramping can be accomplished such that no voltage or current is applied to the load 102. After the output nodes settle at the predetermined voltage level, the controller 114 can couple to, and respond to, the command information of the host.

In certain examples, an example controller 114 can shut down the H-bridge 103 by isolating a control setpoint from the host, controlling the output nodes to a predetermined voltage that does not apply a voltage or current to the load 102, allowing the system to settle at the predetermined voltage, and then ramping the voltage at the output nodes together to ground, the voltage level of one of the supply rails ($V_{IN1}$, $V_{IN2}$), or a voltage level that mitigates stored electrical energy in the system. In certain examples, the shutdown sequence can be initiated by a command or signal of the host or a system condition such as an under-voltage condition of the supply rails ($V_{IN1}$, $V_{IN2}$).

In certain examples, a portion of each start-up and shutdown sequence can be executed using independent half-bridge control of the first half-bridge 104 and the second half-bridge 105. A second portion of each start-up and shutdown sequence can be executed using full bridge control of the H-bridge 103. In half-bridge control, the voltage or current at the output node (e.g., $V_{OUT1}$) of the first half-bridge 104 can be controlled using only the power switches (M1, M2) of the first half-bridge 104. In certain examples, the output voltage or current of the output node (e.g., $V_{OUT1}$) of the first half-bridge 104 can servo, or can be controlled, using feedback information such as the feedback information ($V_{FB1}$) derived from the first voltage divider 115, to a reference signal, such as a reference signal generated by the H-bridge converter. Also, in half-bridge control, the voltage or current at the output node (e.g., $V_{OUT2}$) of the second half-bridge 105 can be controlled using only the power switches (M3, M4) of the second half-bridge 105. In certain examples, the output voltage or current of the output node (e.g., $V_{OUT2}$) of the second half-bridge 105 can servo, or can be controlled, using feedback information such as the feedback information ($V_{FB2}$) derived from the second voltage divider 116, to a reference signal, such as a reference signal generated by the H-bridge converter. In certain examples, where the independent control of the half-bridges 104, 105 share a common clock signal, the voltages ($V_{OUT1}$, $V_{OUT2}$) at the output nodes can be synchronized by switching the first and fourth power switches (M1, M4) together, for example, based on a first state of a PWM signal, and switching the second and third power switches (M2, M3) together, for example, based on a second state of a PWM signal.

During full-bridge control, the differential voltage ($V_{OUT1}$-$V_{OUT2}$) or current of the output nodes of the H-bridge 103 can be controlled using the power transistors (M1, M2, M3, M4) of both half-bridges 104, 105. In certain examples, IN full-bridge control, or full H-bridge control, the first and third power switches (M1, M3) can be switched together based on a first state of a PWM signal and the second and fourth power switches (M2, M4) can be switched together based on a second state of the PWM signal.

Figure 2A:
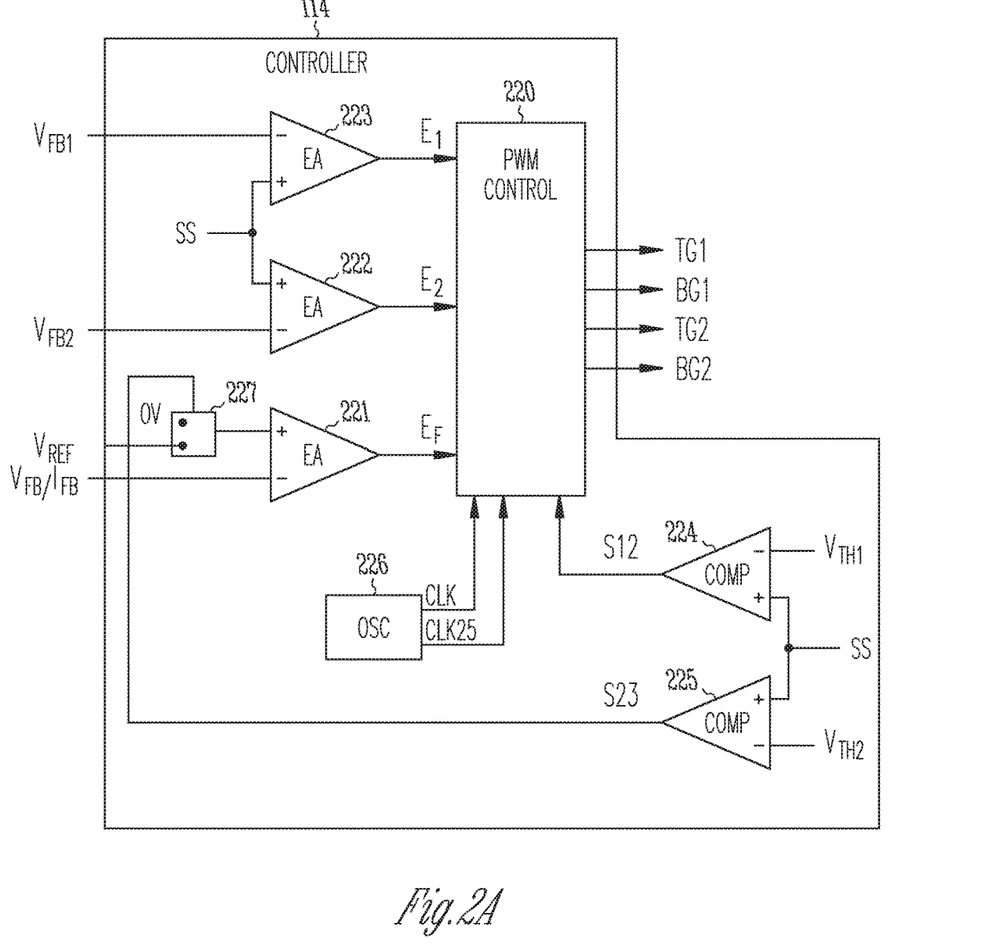
FIG. 2A illustrates generally example control circuitry or controller for providing a soft-start or a soft-stop of an H-bridge.

FIG. 2A illustrates generally example control circuitry or controller 114 for providing a soft-start or a soft-stop of an H-bridge. The controller 114 can include a switch controller 220, such as a pulse-width modulation (PWM) controller, one or more amplifiers 221, 222, 223, one or more comparators 224, 225, and an oscillator circuit 226. A first amplifier 221 can provide a first command error signal derived from command information ($V_{REF}$) of a host and feedback information ($V_{FB}$ or $I_{FB}$) from the H-bridge. The switch controller 220 can be responsive to the first command error signal ($E_F$) when the switch controller 220 is controlling the H-bridge as a full H-bridge and outside of the example start-up and shutdown sequences discussed above. Second and third amplifiers 222, 223, as well as first and second comparators 224, 225, can provide status signals for the switch controller 220 to sequence control of the H-bridge during the start-up and shutdown sequences.

One portion of each of the start-up and shutdown sequence includes controlling each half of the H-bridge individually, sometimes referred to as dual half-bridge control. A second portion of each of the start-up and shutdown sequence includes controlling the H-bridge as a full H-bridge with a predetermined differential output voltage. In certain examples, a ramp signal (SS) received by the first and second comparators 224, 225 can provide sequencing signals for transitioning control of the H-bridge between dual half-bridge control, full H-bridge control with a pre-defined command signal (0V), and full H-bridge control responsive to host command information ($V_{REF}$).

Figure 2B:
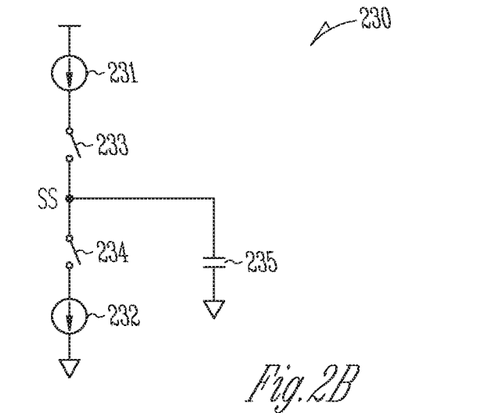
FIG. 2B illustrates one example of a ramp signal generator.

FIG. 2B illustrates one example of a ramp signal generator 230. The ramp signal generator 230 can be part of the controller 114 or the control circuitry. In certain examples, the ramp signal generator 230 can include a first current source 231, a second current source 232, a first switch 233, a second switch 234, and a capacitor 235. During a start-up sequence, the first switch 233 can couple the first current source 231 to a first node of the capacitor 235 to begin charging the capacitor 235. As the capacitor 235 charges, a voltage across the capacitor, the ramp signal (SS), can ramp up in voltage. After the start-up sequence, but before a shutdown sequence, the first node of the capacitor 235 can be isolated from both the first current source 231 and the second current source 232 and the voltage across the capacitor 235 can remain at a charged voltage level or the voltage level the capacitor 235 was charged to at the end of the start-up sequence. In some examples, the capacitor 235 may remain connected to the first current source 231 at the end of the start-up sequence to maintain a certain charge voltage on the capacitor 235.

During a shutdown sequence, the first switch 233 can isolate the capacitor 235 from the first current source 231, in not already isolated, and the second switch 234 can couple the second current source 232 to the first node of the capacitor 235 to begin discharging the capacitor 235, and resulting in a voltage across the capacitor, the ramp signal (SS), ramping down in voltage. After the shutdown sequence, the first node of the capacitor 235 can be isolated from both the first current source 231 and the second current source 232 and the voltage across the capacitor 235 can remain at a discharged voltage level or the voltage level the capacitor 235 was discharged to at the end of the shutdown sequence. In some examples, the capacitor 235 may remain connected to the second current source 232 at the end of the shutdown sequence to maintain a certain discharge voltage on the capacitor 235.

Figure 3:
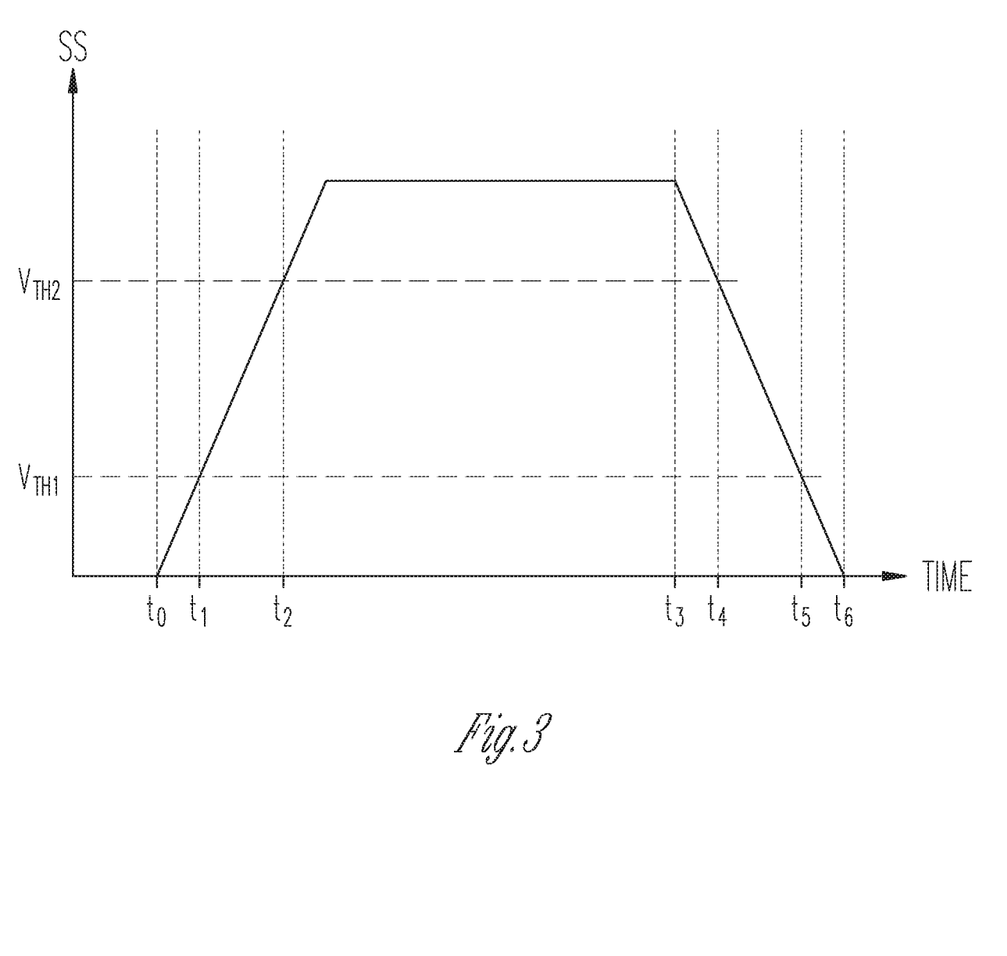
FIG. 3 illustrates graphically a plot of the ramp signal over an operating interval of an example H-bridge converter.

FIG. 3 illustrates graphically a plot of the ramp signal (SS) over an operating interval of an example H-bridge converter. At t0, the controller may have been provided power, or can receive an enable signal indicating, for example, a host attempting to control a load, to initiate the start-up sequence. At t0, the first switch of the ramp signal generator can close and the first current source can begin to charge the capacitor. Referring to FIG. 2A, the ramp signal (SS) can be received by the second and third error amplifiers 222, 223 and summed with a representation of an output node voltage ($V_{OUT1}$, $V_{OUT2}$) of each of the half-bridges. The resulting error signals ($E_1$, $E_2$) of the amplifiers 222, 223 can be used by the switching controller 220 to individually control each half-bridge such that the output voltage ($V_{OUT1}$, $V_{OUT2}$) of each of the half-bridges track with the ramp signal (SS). In certain examples, the feedback control of the half-bridges assures that the load receives very little voltage or current as the output nodes of each half-bridge are regulated with the ramp signal (SS). At t1, the first comparator of the control circuitry can provide an indication when the level of the ramp signal (SS) reaches a first threshold ($V_{th1}$). In certain examples, the first threshold ($V_{th1}$) can correspond to an end of the first portion of the start-up sequence and the beginning of the second portion.

In certain examples, although not limited as such, the first threshold ($V_{th1}$) can represent a voltage ($V_{OUT1}$, $V_{OUT2}$) of each output node of the half-bridges, when referenced to a supply rail, at about one-half the differential supply voltage ($V_{IN1}$-$V_{IN2}$) of the H-bridge converter.

At t1, in response to the ramp signal (SS) at or above the first threshold ($V_{th1}$), the controller can switch control to full H-bridge control and can regulate to provide zero volts to the load. A zero-volt reference (0V), via a switch 227 controlled by the output of the second comparator 225, can be coupled to an input of the first error amplifier 221 to provide a command set point for the switching controller during full H-bridge control. In certain examples, the oscillator circuit 226 can include a first clock signal (CLK) and a second clock signal (CLK25). The second clock signal (CLK25) can be offset from the first clock signal (CLK) by one quarter of the period of the switching frequency of the H-bridge. The first clock signal (CLK) can be used to synchronize and pace switching logic for each half-bridge when the H-bridge is in a dual half-bridge control mode. When the controller switches to full H-bridge control in response to the ramp signal (SS) at or above the first threshold ($V_{th1}$), the controller 114 can use both the first clock signal (CLK) and the second clock signal (CLK25) to transition and pace the switching logic into and out of full bridge control.

In some examples, the ramp signal (SS) can continue to increase at the end of the first portion of the start-up sequence and can be used to time the second portion of the start-up sequence. Referring to FIGS. 2 and 3, at t2, when the ramp signal (SS) attains the second threshold ($V_{th2}$), the output of the second comparator 225, via the switch 227, can isolate the zero-volt reference from an input of the first error amplifier 221 and can couple host command information ($V_{REF}$) to the input of the first error amplifier 221 to conclude the start-up sequence. The host, via the host command information ($V_{REF}$), can use the H-bridge under full H-bridge control to control the load via output voltage control or output current control.

At t3, the shutdown sequence can be initiated. The shutdown sequence can be initiated by a number of events including, but not limited to, a host command such as a disable command or signal, a loss of supply voltage as indicated by, for example, an under-voltage signal, or a combination thereof. Upon initiating the shutdown sequence, the ramp signal generator can begin to discharge the capacitor. At t4, as the voltage level of the ramp signal falls below the second threshold ($V_{th2}$), the host command information ($V_{REF}$) can be isolated from the first error amplifier 221 and can be replaced by the zero-volt reference (0V) via the switch 227 controlled by the output of the second comparator 225. Between t4 and t5, the ramp signal (SS) can be used to provide a settling interval for the system. At t5, as the voltage of the ramp signal (SS) falls below the first threshold ($V_{th1}$), an output of the first comparator 224 can initiate a transition of the switching controller 220 from the full H-bridge control mode to dual half-bridge control. In certain examples, the transition between full-bridge and half-bridge control can occur on a transition of the second cloak signal (CLK25) to assist in synchronizing switching of each half-bridge. In addition, at t5, feedback control response can be passed from the first amplifier 221 to the error signals ($E_1$, $E_2$) generated by the second and third amplifiers 222, 223. Between t5 and t6, each half-bridge can be individually controlled, synchronized via the first clock (CLK), such that the voltage ($V_{OUT1}$, $V_{OUT2}$) of each output node tracks with the ramp signal (SS) to a value that discharges electrical energy from the converter. In certain examples, after the ramp signal (SS) has been fully discharged, the controller 114 can electrically couple the output nodes, and the corresponding supply leads of the load, together. For an inductive load such as a motor load, as an example, coupling, or shorting, the supply leads of the load together can provide an electronic brake and can prevent the load from developing or storing electrical energy after being shut down.

Figure 4:
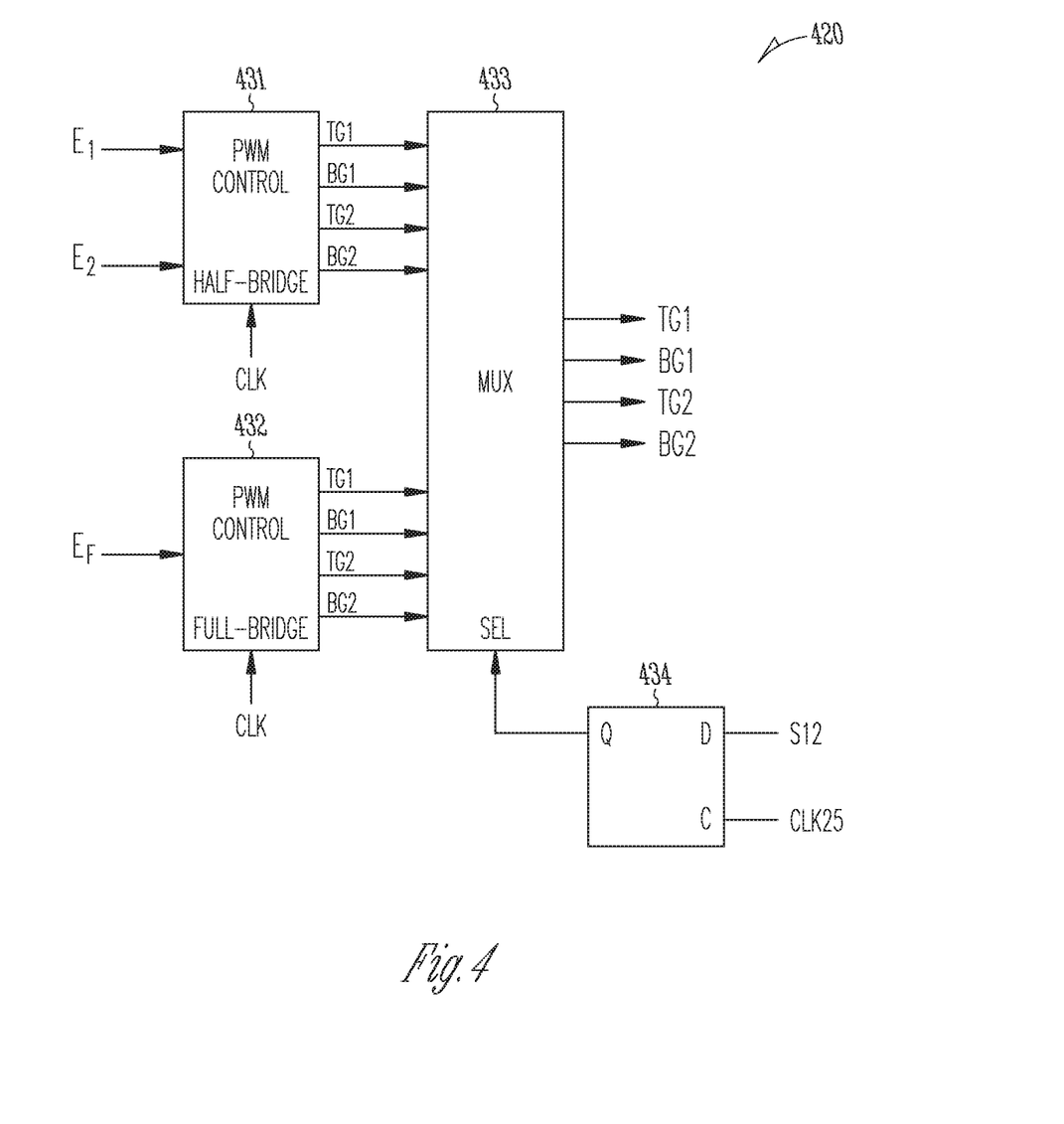
FIG. 4 illustrates generally an example PWM controller.

FIG. 4 illustrates generally an example PWM controller 420. The PWM controller 420 is an example of a switching controller and can include first switching logic 431 for individually controlling at least two half-bridges, second switching logic 432 for full H-bridge control, a multiplexer 433 for coupling the outputs of the switching logic 431, 432 with the control nodes or drivers of the power transistors of the bridge, and control logic 434 for controlling the multiplexer 433. In certain examples, the first switching logic 431 can receive the first clock signal (CLK) and the error information ($E_1$, $E_2$) provided from the second and third amplifiers (FIG. 2; 222, 223). The first switching logic 431 can include switching logic to servo a voltage of an output node of a half-bridge to a reference signal via an error amplifier. In some examples, the first switching logic 431 can include switching logic to individually control each half-bridge of the H-bridge. In certain examples, the switching logic for each half-bridge is synchronized using the first clock signal (CLK). The second switching logic 423 can receive the first clock signal (CLK) and the error information ($E_F$) provided from the first amplifier (FIG. 2; 221). The second switching logic 432 can control the H-bridge in a full-bridge control mode. The multiplexer 433 can receive the outputs from the switching logic 431, 432 and a control input from the control logic 434 to couple the appropriate set of inputs to the output of the multiplexer 433. The output of the multiplexer 433 can provide control signals (TG1, BG1, TG2, BG2) for the power transistors (M1, M2, M3, M4). In certain examples, the control logic 434 can include a flip-flop or latch responsive to an output of the first comparator (FIG. 2, 224) and the second clock signal (CLK25).

Figure 5A:
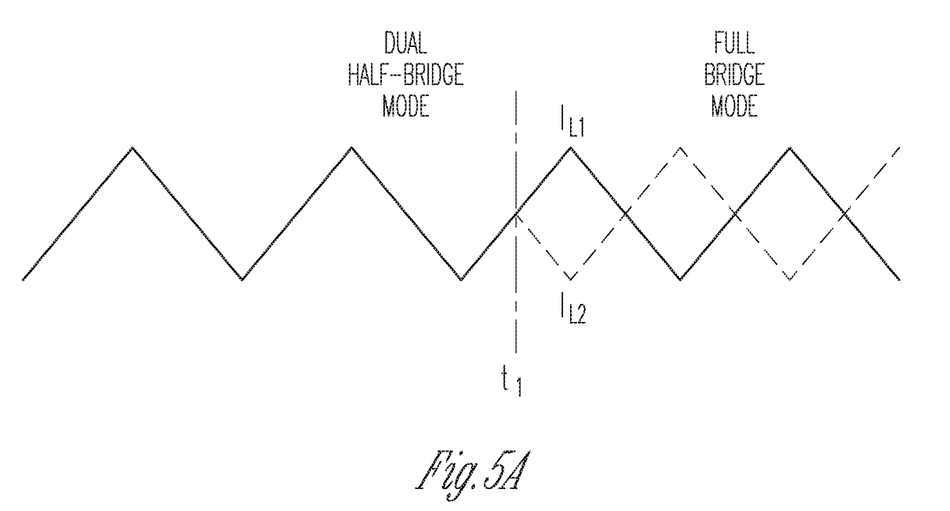
FIGS. 5A and 5B illustrate example inductor waveforms of the H-bridge over intervals including transitions between full H-bridge control and dual half-bridge control modes.
Figure 5B:
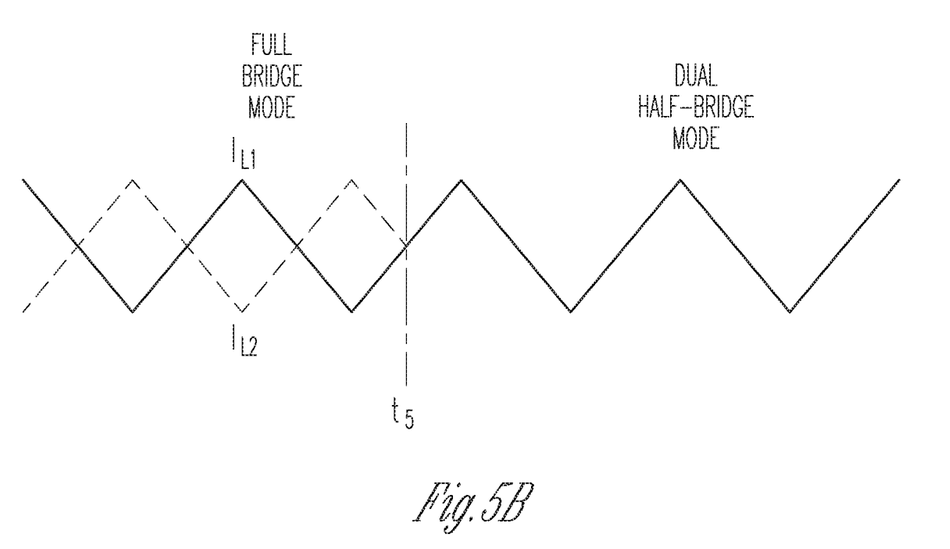

FIGS. 5A and 5B illustrate example inductor waveforms ($I_{L1}$, $I_{L2}$) of the H-bridge over intervals including transitions between full H-bridge control and half-bridge control modes. FIG. 5A illustrates generally the inductor waveforms ($I_{L1}$, $I_{L2}$) during a soft start-up of an H-bridge converter according to the example of FIG. 1. The soft start up includes using dual half-bridge control until the output voltage of each half-bridge reaches predetermined level represented by a first threshold ($V_{th1}$) compared to the ramp signal (SS). At t1, upon the output voltage of each half-bridge reaching the predetermined level, and on a desired transition of the second clock signal (CLK25), control of the H-bridge can transition to a full H-bridge control mode and the current ($I_{L1}$, $I_{L2}$) of each inductor can be offset in phase compared to the current ($I_{L1}$, $I_{L2}$) of each inductor during the dual half-bridge control interval. In the illustrated example of FIG. 5A, the offset can be about 25% of the switching period.

FIG. 5B illustrates generally a soft shutdown of an H-bridge converter according to the example of FIG. 1. A soft shut down can continue full H-bridge control for a settling interval as the differential output voltage setpoint for the H-bridge is set to a zero-volt reference. The timing of the settling interval can be provided by the ramp signal (SS) as the ramp signal (SS) falls to the first threshold ($V_{th1}$). At t5, upon the voltage of the ramp signal (SS) reaching the first threshold ($V_{th1}$), and on a desired transition of the second clock signal (CLK25), control of the H-bridge can transition from a full bridge control mode to a dual half-bridge control mode where each half-bridge can be independently controlled using the first clock signal (CLK). During half-bridge control, the ramp signal (SS) can be used as a representative setpoint for the output voltage of each half-bridge. As the ramp signal (SS) goes to zero, the voltage of each half-bridge output can ramp to zero volts or some other disabled voltage.

Figure 6:
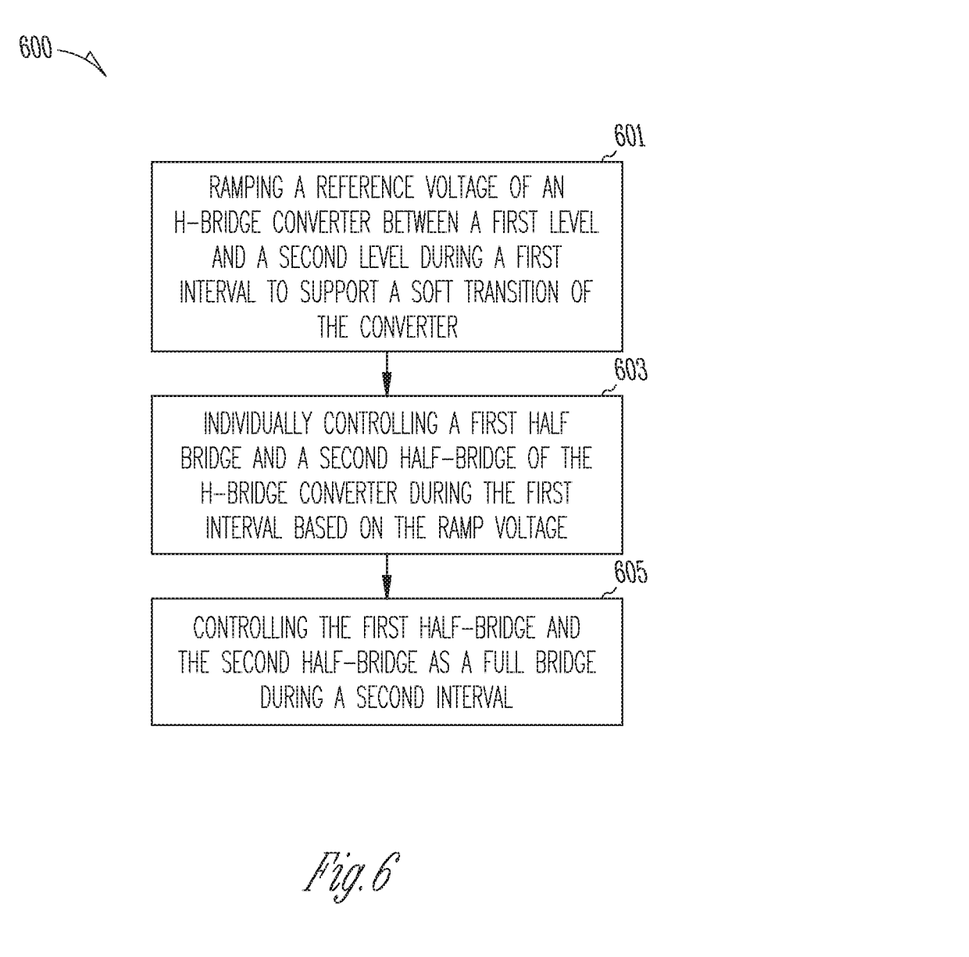
FIG. 6 illustrates generally a flowchart of an example method for operating an H-bridge converter.

FIG. 6 illustrates generally a flowchart of an example method 600 for operating an H-bridge converter. More specifically, the flowchart illustrates example techniques for soft transitions of a H-bridge converter. At 601, a reference voltage of the H-bridge converter can be ramped to support a soft transition of the converter. The soft transition can be a soft start transition when the converter is powered up and control is handed over to a host at the end of the transition. The soft transition can be a soft shutdown when power is removed from the converter or when the host is disabled such as by a power loss. At 603, each half-bridge of the H-bridge controller can be individually controlled and the voltage at the output of each half-bridge can be served to, or slaved to, the ramped reference voltage during the first interval. At 605, control can be transitioned between dual half-bridge control of the first interval and full bridge control of a second interval. At the beginning or the end of the second interval, a setpoint reference for the differential voltage or current of the full bridge can be exchanged between a zero-reference of the converter and a command information of a host.

During a soft start sequence, the reference voltage can be ramped up from a shutdown value, the first interval can precede the second interval and the exchange of the setpoint reference from the zero-reference of the converter to the command information of the hoist can occur at the end of the second interval. During a soft shut down, the exchange of the setpoint reference from the command information of the host to the zero-reference of the converter can occur at the beginning of the second interval, the second interval can precede the first interval, and the reference voltage can be ramped down to the shutdown value. In certain examples, upon shutdown, the supply leads of the load can be shorted together to provide an electronic brake and can prevent the load from developing or storing electrical energy after being shut down. In certain examples, the supply leads of the load can be shorted together, and to ground, using the bottom switches (FIG. 1 M2, M4).

VARIOUS NOTES & EXAMPLES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, the terms "including" and "comprising" are open-ended, that is, a system, device, article, composition, formulation, or process that includes elements in addition to those listed after such a term is still deemed to fall within the scope of subject matter discussed. Moreover, such as may appear in a claim, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of a claim. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. The following aspects are hereby incorporated into the Detailed Description as examples or embodiments, with each aspect standing on its own as a separate embodiment, and it is contemplated that such embodiments can be combined with each other in various combinations or permutations.

What is claimed is:

1. A method for terminal control and handoff of an H-bridge converter coupled to a load, the H-bridge converter having a first half-bridge coupled to the load at a first node and a second half-bridge coupled to the load at a second node, each half-bridge having a first switch coupled in series at a first bridge node with a second switch and each half-bridge coupled between a first power rail and a second power rail, the method comprising:
   ramping a reference voltage between a first level and a second level during a first interval;

controlling an output voltage of each of the first half-bridge and the second half-bridge independently during the first interval based on the reference voltage; and controlling the first half-bridge and second half-bridge as a full H-bridge during a second timed interval.

2. The method of claim 1, wherein controlling an output voltage of each of the first half-bridge and the second half-bridge independently during the first interval includes:

servoing a voltage level of the first node to the reference voltage during the first interval; and servoing a voltage level of the second node to the reference voltage during the first interval.

3. The method of claim 2, wherein controlling the first half-bridge and second half-bridge as a full H-bridge during a second timed interval includes servoing a differential voltage between the first node and the second node to zero volts during the second timed interval.

4. The method of claim 2, wherein the first interval is when the reference voltage is below a first threshold.

5. The method of claim 4, wherein the second interval is when the reference voltage is above the first threshold.

6. The method of claim 1, wherein the first interval precedes the second interval to provide a soft start of the H-bridge converter.

7. The method of claim 1, wherein the second interval precedes the first interval to provide a soft stop of the H-bridge converter.

8. The method of claim 1, wherein a voltage difference between the first power rail and the second power rail provide a supply voltage for the H-bridge converter;

wherein the first level of the reference voltage is indicative of a voltage level of the second power rail; and wherein the second level of the reference voltage is indicative of half the supply voltage.

9. The method of claim 1, including, at a transition of controlling each of the first half-bridge and the second half-bridge independently during the first interval to controlling the first half-bridge and second half-bridge as a full H-bridge during a second timed interval, adjusting a switching sequence of one of the first half-bridge or the second half-bridge at an offset of a switching cycle of the first interval.

10. The method of claim 1, wherein servoing the voltage level of the first node includes energizing a first LC circuit coupled between the bridge node of the first half-bridge and the load.

11. The method of claim 1, wherein servoing the voltage level of the first node includes energizing a second LC circuit coupled between the bridge node of the second half-bridge and the load.

12. An H-bridge converter having a first half-bridge configured to couple to a load and a second half-bridge configured to couple to the load, each half-bridge having a first switch coupled in series at a bridge node with a second switch between a first power rail and a second power rail, the H-bridge converter further comprising:

a first error amplifier configured to receive a representation of a first output voltage of the first half-bridge and a first reference;

a second error amplifier configured to receive a representation of a second output voltage of the second half-bridge and the first reference; and a controller configured to control the first and second switches of the first half-bridge and the second half-bridge of the H-bridge converter based on an output of the first error amplifier and an output of the second error amplifier.

13. The H-bridge converter of claim 12, wherein the controller includes a ramp circuit configured to adjust a level of the first reference when the H-bridge converter starts up and when the H-bridge converter shuts down, the ramp circuit configured to charge a ramp capacitor during a start-up interval and to discharge the ramp capacitor during a shutdown interval; and wherein a voltage across the ramp capacitor is the first reference.

14. The H-bridge converter of claim 13, including a controller configured to independently control each half-bridge during the start-up interval and during the shutdown interval.

15. The H-bridge converter of claim 14, including a first mode-change comparator configured to receive the first reference and a first ramp threshold; and wherein the controller is further configured to transition between independent half-bridge control of the first half-bridge and the second half-bridge and full H-bridge control of the first half-bridge and the second half-bridge responsive to an output of the first mode-change comparator.

16. The H-bridge converter of claim 15, including a second mode-change comparator configured to receive the first reference and a second ramp threshold; and wherein the controller is further configured to transition between a first H-bridge reference and a second H-bridge reference in response to an output of the second mode-change comparator; and wherein the first H-bridge reference and the second H-bridge reference define a desired current or voltage to be supplied by the H-bridge converter to the load.

17. The H-bridge converter of claim 16, wherein the first H-bridge reference is a zero-current or zero voltage reference.

18. The H-bridge converter of claim 12, including:

a first inductor-capacitor circuit coupled between the bridge node of the first half-bridge and the load; and a second inductor-capacitor circuit coupled between the bridge node of the second half-bridge and the load.

19. A H-bridge converter system comprising:

a first half-bridge including a first switch coupled in series at a first bridge node with a second switch, the first half-bridge configured to couple between a first power rail and a second power rail, the first bridge node configured to provide power to a load;

a second half-bridge including a third switch coupled in series at a second bridge node with a fourth switch, the second half-bridge configured to couple between the first power rail and the second power rail, the second bridge node configured to provide power to the load;

means for transitioning a reference voltage between a first level and a second level during a first interval;

first means for controlling each of the first half-bridge and the second half-bridge independently during the first interval, wherein the first means for controlling includes:

means for servoing a voltage level of a first output node of the first half-bridge to the reference voltage during the first interval;

means for servoing a voltage level of a second output node of the second half-bridge to the reference voltage during the first interval, second means for controlling the first half-bridge and second half-bridge as a full H-bridge during a second timed interval; and means for servoing a differential voltage between the first output node and the second output node to zero volts during the second interval.

20. The H-bridge converter system of claim 19, including means for servoing a voltage differential of the first output node and the second output node to a command input during a third interval.

21. The H-bridge converter system of claim 20, including, at a transition of controlling each of the first half-bridge and the second half-bridge independently during the first interval to controlling the first half-bridge and second half-bridge as a full H-bridge during the second timed interval, means for adjusting a switching sequence of one of the first half-bridge or the second half-bridge at an offset of a switching cycle of the first interval.

* * * * *